United States Patent
Maehara (10) Patent No.: US 7,358,705 B2
(45) Date of Patent: Apr. 15, 2008

(54) APPARATUS OF CONTROLLING POWER GENERATION OF A GENERATOR

(75) Inventor: Fuyuki Maehara, Nagoya (JP)

(73) Assignee: Denso Corporation, Kariya (JP)

( * ) Notice: Subject to any disclaimer, the term of this patent is extended or adjusted under 35 U.S.C. 154(b) by 93 days.

(21) Appl. No.: 11/359,463

(22) Filed: Feb. 23, 2006

(65) Prior Publication Data

US 2006/0197346 A1 Sep. 7, 2006

(30) Foreign Application Priority Data

Mar. 1, 2005 (JP) ............................. 2005-056432

(51) Int. Cl.
*H02P 7/06* (2006.01)
*H02P 9/00* (2006.01)

(52) U.S. Cl. .......................................... 322/27; 322/28

(58) Field of Classification Search .................. 322/22, 322/25, 28, 29, 36, 45, 59, 99, 27
See application file for complete search history.

(56) References Cited

U.S. PATENT DOCUMENTS

| | | | | |
|---|---|---|---|---|
| 4,379,990 A | * | 4/1983 | Sievers et al. | 322/99 |
| 4,623,833 A | * | 11/1986 | Edwards | 322/28 |
| 4,985,670 A | * | 1/1991 | Kaneyuki et al. | 322/28 |
| 5,140,253 A | * | 8/1992 | Itoh | 322/28 |
| 5,157,321 A | * | 10/1992 | Kato et al. | 322/28 |
| 5,319,299 A | * | 6/1994 | Maehara | 322/28 |
| 5,581,172 A | * | 12/1996 | Iwatani et al. | 322/28 |
| 6,433,519 B2 | * | 8/2002 | Taniguchi et al. | 322/28 |
| 6,462,516 B1 | * | 10/2002 | Watanabe | 322/28 |
| 6,462,517 B2 | * | 10/2002 | Asada | 322/28 |
| 6,555,993 B2 | * | 4/2003 | Taniguchi et al. | 322/28 |
| 6,803,747 B2 | * | 10/2004 | Taniguchi et al. | 322/28 |

FOREIGN PATENT DOCUMENTS

JP B2-3283325 3/2002

* cited by examiner

*Primary Examiner*—Nicholas Ponomarenko
(74) *Attorney, Agent, or Firm*—Oliff & Berridge, PLC (57) ABSTRACT

An apparatus for controlling power generation of a generator has a voltage detector and a power controller. The voltage detector detects a voltage of electric power generated in the generator. When receiving a first power control signal, the power controller controls the generator to maintain the detected voltage at a first target value. When receiving a second power control signal, the power controller controls the generator such that the power controller suppresses the power generation of the generator based on a difference between a value of the detected voltage and a second target value lower than the first target value so as to maintain the detected voltage at a predetermined value lower than the first target value. Therefore, even when the power generation is suppressed, pulsation of the generated electric power can be appropriately restrained.

19 Claims, 5 Drawing Sheets

APPARATUS OF CONTROLLING POWER GENERATION OF A GENERATOR

CROSS-REFERENCE TO RELATED APPLICATION

This application is based upon and claims the benefit of priority of the prior Japanese Patent Application 2005-056432 filed on Mar. 1, 2005 so that the contents of which are incorporated herein by reference.

BACKGROUND OF THE INVENTION

1. Field of the Invention

The present invention generally relates to an apparatus for controlling power generation performed in a generator of a vehicle based on electric power consumed by current consumers.

2. Description of Related Art

In recent years, to improve fuel economy of vehicles, an engine idle speed has been lowered as much as possible. Auxiliary units such as a generator, an alternator and the like are driven by an engine, so that the engine idle speed is changed with the driving torque required by the auxiliary units. For example, an alternator is driven to charge electric power to a battery. When a driving torque required by the alternator is increased, the engine idle speed is heightened. Therefore, the engine idle speed is often changed, and fuel economy of the vehicle undesirably deteriorates. To improve the fuel economy, for example, when a driving torque required by the alternator is increased in an idling time of an engine, power generation of the alternator is suppressed. Therefore, the increase of the driving torque required by the alternator is suppressed, so that the engine idle speed can be stabilized.

However, when current consumers of a vehicle consume a large amount of electric power of a battery charged by the alternator, the suppression of the power generation of the alternator causes an output voltage of the battery to be easily lowered. In addition, internal resistance of the battery sometimes becomes large due to degradation of the battery, or wiring resistance of wirings between the battery and each current consumer sometimes becomes large due to contact failures occurred in the wirings. In this case, the battery voltage applied to the current consumers is further lowered. When the battery voltage is extremely lowered, an engine controller consuming the electric power of the battery sometimes cannot control an engine. Therefore, there is a possibility that the engine cannot be reliably driven under control of the engine controller when a vehicle starts running.

Nowadays, current consumers assembled into a vehicle, such as an electrically operated power steering or the like, have been increased, so that electric power of a battery is intended to be consumed in large degrees. Therefore, when power generation of an alternator is suppressed, a battery voltage is often lowered. To solve this problem, an alternator controller is disclosed in Published Japanese Patent Second Publication No. 3283325. In this Publication, when a battery voltage is lowered to a value lower than a predetermined value due to the suppression of power generation of an alternator, the alternator controller controls the alternator to stop the suppression of the power generation and to generate electric power without being suppressed.

However, in a case where this controller is used in a vehicle, suppression and non-suppression of power generation in the power generation are often repeated in the alternator. As a result, an amount of the electric power generated in the alternator undesirably pulsates or fluctuates, so that the driving torque required in the alternator also pulsates or fluctuates. In this case, the engine idle speed inevitably becomes unstable. An engine controller sometimes controls an engine based on a driving torque required in the alternator. When a driving torque of the alternator pulsates, the engine controller cannot correctly detect the driving torque. Therefore, the engine controller cannot perform the optimum control for the engine due to pulsation of the driving torque.

Further, when the engine controller transmits a suppression instruction erroneously generated based on failures or the like to the alternator controller, the alternator controller erroneously controls the alternator to undesirably continue to suppress the power generation. In this case, a battery undesirably continues to discharge electric power. As a result, electric power of the battery is excessively lowered, and the battery is sometimes dead.

Moreover, a predetermined voltage value is preset in the controller, and the suppression of the power generation in the alternator is ended when a battery voltage is lowered to the predetermined voltage value. An operation voltage required to operate each current consumer differs from those required to operate the other current consumers. The predetermined voltage value is determined based on the highest operation voltage among those of the current consumers. In this case, even when only current consumers requiring operation voltages lower than the predetermined voltage value are operated, the suppression of the power generation is undesirably discontinued when the battery voltage reaches the predetermined voltage value higher than the operation voltages. Therefore, the increase of the driving torque required in the alternator cannot be sufficiently suppressed, and the fuel economy is lowered.

SUMMARY OF THE INVENTION

An object of the present invention is to provide, with due consideration to the drawbacks of the conventional alternator controller, an apparatus which appropriately restrains a change in electric power generated in a generator even when the electric power of the generator is suppressed.

According to an aspect of this invention, the object is achieved by the provision of an apparatus for controlling power generation of a generator having a voltage detector and a power controller. The voltage detector detects a voltage of electric power generated in the generator. When receiving a first power control signal, the power controller controls the generator to generate the electric power so as to maintain the voltage detected by the voltage detector at a first target value. When receiving a second power control signal, the power controller controls the generator such that the power controller suppresses the power generation of the generator based on a difference between a value of the detected voltage and a second target value lower than the first target value so as to maintain the detected voltage at a predetermined value lower than the first target value.

Because the power generation is suppressed based on a difference between a value of the detected voltage and the second target value lower than the first target value, the detected voltage can be maintained at a predetermined value lower than the first target value by maintaining the difference at a constant value. Accordingly, even though the power generation is suppressed, a change in the generated power can be restrained.

It is preferable that an engine controller disposed outside the apparatus intermittently detect an operation condition of a current consumer consuming the electric power, set the second target value according to the detected operation condition, transmit the second target value to the power controller, and change a value of the second target value when detecting a change of the operation condition of the current consumer.

Therefore, even when the operation condition of the current consumer is changed, the apparatus can appropriately restrain a change in the electric power.

Preferably, the power controller controls the generator such that the voltage is set at a third target value higher than the second target value and lower than the first target value when continuation of the detected voltage maintained at the predetermined value exceeds a first predetermined period of time.

Therefore, when the generated electric power is once stored in a battery and is transmitted from the battery to a current consumer, the apparatus can prevent an output voltage of the battery from being excessively lowered even when suppression of power generation in the generator is undesirably continued.

DETAILED DESCRIPTION OF THE PREFERRED EMBODIMENTS

Embodiments of the present invention will now be described with reference to the accompanying drawings.

Embodiment 1

Figure 1:
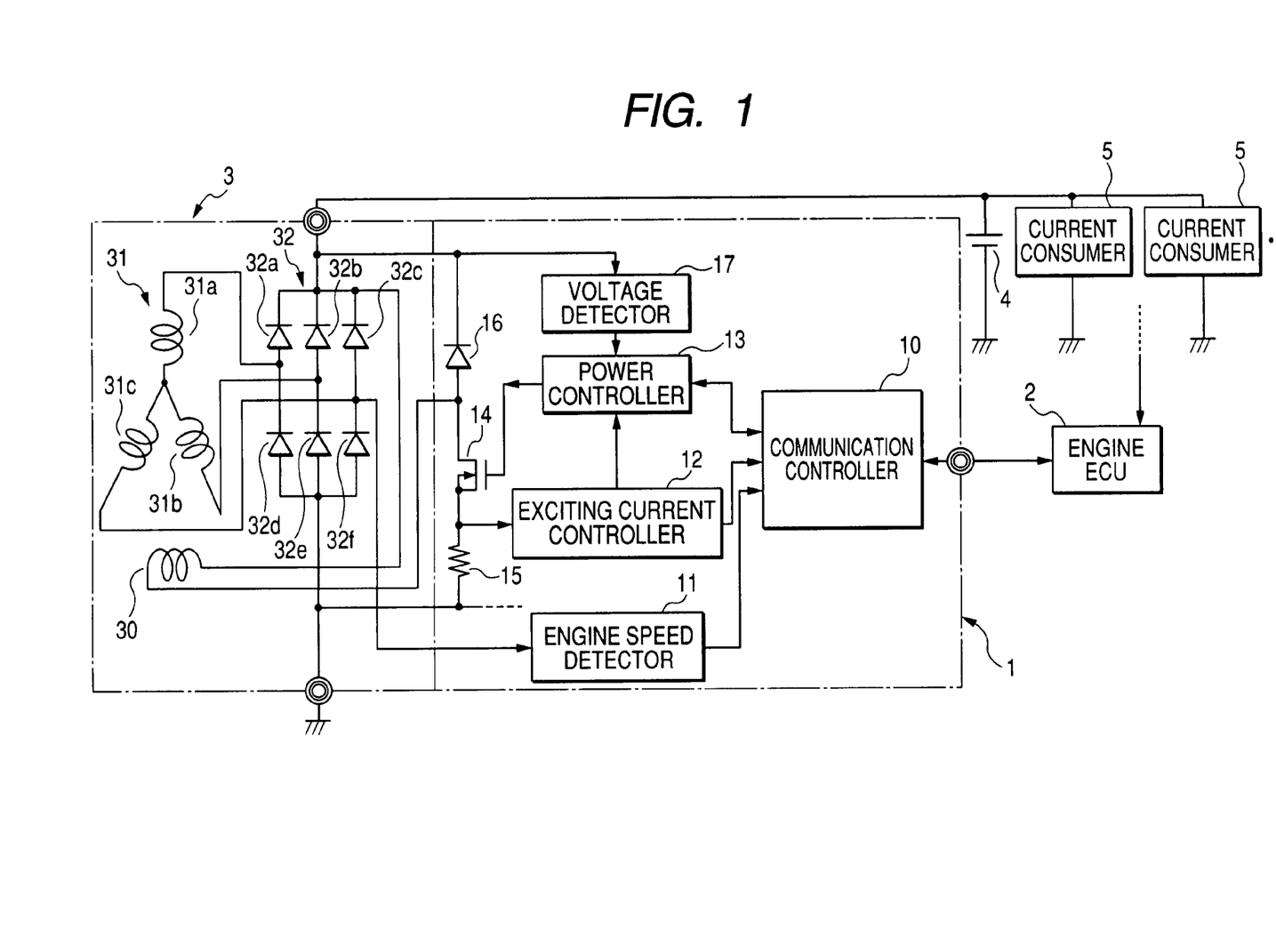
FIG. 1 is a block diagram of a power generation control apparatus connected with a generator and an engine controller according to embodiments of the present invention.

FIG. 1 is a block diagram of a power generation control apparatus connected with a generator and an engine controller according to embodiments of the present invention.

As shown in FIG. 1, an engine 3 generates electric power and charges the power to a battery 4. The power of the battery 4 is consumed in a plurality of current consumers 5. An engine electronic control unit (engine ECU) 2 detects an amount of electric power consumed in the current consumers 5 and a battery voltage of the battery 4 and generates instruction values based on detected data to control the generator 3. A power generation control apparatus 1 receives the instruction values from the engine ECU 2 and controls the generator 3 in response to the instruction values. The generator 3 generates the electric power under control of the apparatus 1.

The control apparatus 1 has a power controller 13 and a voltage detector 17. The detector 17 detects a voltage of electric power generated in the generator 3. The controller 13 receives either a first power control signal or a second power control signal. When receiving the first power control signal from the engine ECU 2, the controller 13 controls the generator 3 such that the generator 3 generates the electric power so as to maintain the voltage detected by the voltage detector at a first target value. When receiving a second power control signal from the engine ECU 2, the controller 13 controls the generator 3 such that the power generation of the generator 3 is suppressed based on a difference between a value of the detected voltage and a second target value lower than the first target value so as to maintain the detected voltage at a predetermined value lower than the first target value.

Because the power generation is suppressed based on a difference between a value of the detected voltage and the second target value lower than the first target value, the detected voltage can be maintained at a predetermined value lower than the first target value by maintaining the difference at a constant value. Accordingly, even though the power generation is suppressed, a change in the generated power can be restrained, and pulsation of a driving torque required in the generator 3 can be restrained.

In this embodiment, the control apparatus 1, the engine ECU 2, the generator 3, the battery 4 and the current consumers 5 are, for example, assembled into a vehicle, and the control apparatus 1 controls the generator 3 driven by an engine of a vehicle.

The engine ECU 2 intermittently receives information indicating an output voltage of the battery 4 and operation conditions (for example, values of consumed power) of the current consumers 5 from sensors (not shown) and sets a plurality of instruction values including a first power control signal or a second power control signal based on the information. These instruction values including the control signal are used to control the generator 3. The first power control signal causes the generator 3 to generate electric power without suppressing the power generation. The second power control signal causes the generator 3 to generate electric power while suppressing the power generation. Further, the engine ECU 2 receives an accident informing signal from the control apparatus 1 during the suppression of the power generation. This signal indicates the occurrence of an accident during the suppression of the power generation. In response to this signal, the engine ECU 2 outputs an alarm and executes processing to deal with an accident occurred during the suppression.

The generator 3 is driven by a driving force of an engine (not shown) and outputs an alternating current (AC) voltage in response to an exciting current controlled by the apparatus 1. The generator 3 has an exciting winding 30, an armature winding 31 and a rectifying circuit 32. The winding 30 is wound on a rotator (not shown). One end of the winding 30 is connected with the circuit 32, and another end of the winding 30 is connected with the apparatus 1.

The armature winding 31 is set in a form of a three-phase winding composed of three phase windings 31a, 31b and 31c connected with each other in Y connection and wound around an armature core (not shown). Open terminals of the windings 31a to 31c are connected with the circuit 32, and the open terminal of the winding 31c is further connected with the control apparatus 1.

The rectifying circuit 32 converts the three-phase AC voltage generated in the winding 31 into a direct current (DC) voltage by rectifying the AC voltage generated in the winding 31 in full wave. The circuit 32 has a plurality of diodes 32a, 32b, 32c, 32d, 32e and 32f connected with one another in three-phase bridge rectifier connection. Cathodes of the upper diodes 32a to 32c of the three-phase bridge are connected with the one end of the winding 30 and the control apparatus 1 and a positive terminal of the battery 4, and anodes of the lower diodes 32d to 32f of the three-phase bridge are grounded to a vehicle body (not shown). A connection point of the diodes 32a and 32d, a connection point of the diodes 32b and 32e and a connection point of the diodes 32c and 32f are connected with the open terminals of the windings 31a to 31c, respectively. A negative terminal of the battery is grounded to the vehicle body.

An exciting current controlled by the apparatus 1 flows through the winding 30, so that a magnetic flux is generated in the winding 30. When the rotor with the winding 30 is rotated around the winding 31 by a driving force of the engine such that the winding 31 goes across the magnetic flux of the winding 30, electric power of a three-phase AC voltage is generated in the winding 31. The electric power of the AC voltage is rectified in the circuit 32 to produce electric power of an DC voltage, and the electric power of the DC voltage is charged into the battery 4.

The control apparatus 1 may control an exciting current supplied to the winding 30 of the generator 3 based on the instruction values intermittently transmitted from the engine ECU 2, a previous exciting current flowing through the generator 3 and a voltage of the power generated in the generator 3. Further, the apparatus 1 can output an accident informing signal to the engine ECU 2 when the apparatus 1 judges that an accident or a failure occurs in the engine ECU 2, the generator 3, the battery 4 or the current consumers 5 during the suppression of the power generation. In addition to the voltage detector 17 and the power controller 13, the apparatus 1 may have a communication controller 10, an engine speed detector 11, an exciting current detector 12, a field effect transistor 14, a resistor 15 for detection of an exciting current, and a diode 16 for circulation of an exciting current.

The detector 11 intermittently detects an engine speed based on a voltage generated in the winding 31c and transmits the detected engine speed to the controller 10. The detector 12 detects an exciting current flowing through the winding 30 and transmits the detected exciting current to both the controllers 10 and 13. The controller 10 intermittently receives the instruction values from the engine ECU 2, converts the instruction values into control data and outputs the control data to the controller 13. Further, the controller 10 receives data of the engine speed and exciting current from the detectors 11 and 12 and transmits the data to the engine ECU 2. Moreover, the controller 10 receives an accident informing signal from the controller 13 and transmits the signal to the engine ECU 2.

The detector 17 detects a voltage of electric power outputted from the generator 3 and applied to the cathodes of the diodes 32a to 32c. The controller 13 has a microcomputer which generates a pulse width modulation (PWM) signal based on the instruction values received from the engine ECU 2 through the controller 10, an exciting current previously detected in the detector 12 and a voltage detected in the detector 17. Further, when detecting an accident or failure during the suppression of the power generation, the controller 13 outputs an accident informing signal to the engine ECU 2 through the controller 10.

The transistor 14 has a gate connected with the controller 13, a drain connected with the other terminal of the wiring 30 and a source grounded to the vehicle body through the resistor 15. The transistor 14 receives the PWM signal from the power controller 13 and are turned on and off in response to high and low levels of the signal to perform a switching operation. A ratio of a high level period of time to a total period of time in the signal is defined as a duty ratio Fduty. Therefore, an effective value of the exciting current is controlled according to the duty ratio Fduty. The power controller 13 acts as an exciting current controller.

The resistor 15 has one terminal connected with the source of the transistor 14 and another terminal grounded. An exciting current detection line between the transistor 14 and the resistor 15 is set at a specific voltage corresponding to a value of an exciting current, and the circuit 12 receives the specific voltage from the detection line.

The diode 16 has a cathode connected with the cathodes of the diodes 32a to 32c and an anode connected with the other end of the winding 30. When the transistor 14 is turned off, an exciting current flowing through the winding 30 is returned to the cathodes of the diodes 32a to 32c as a circulation current.

Next, an operation of the control apparatus 1 is described with reference to FIGS. 1, 2 and 3.

Figure 2:
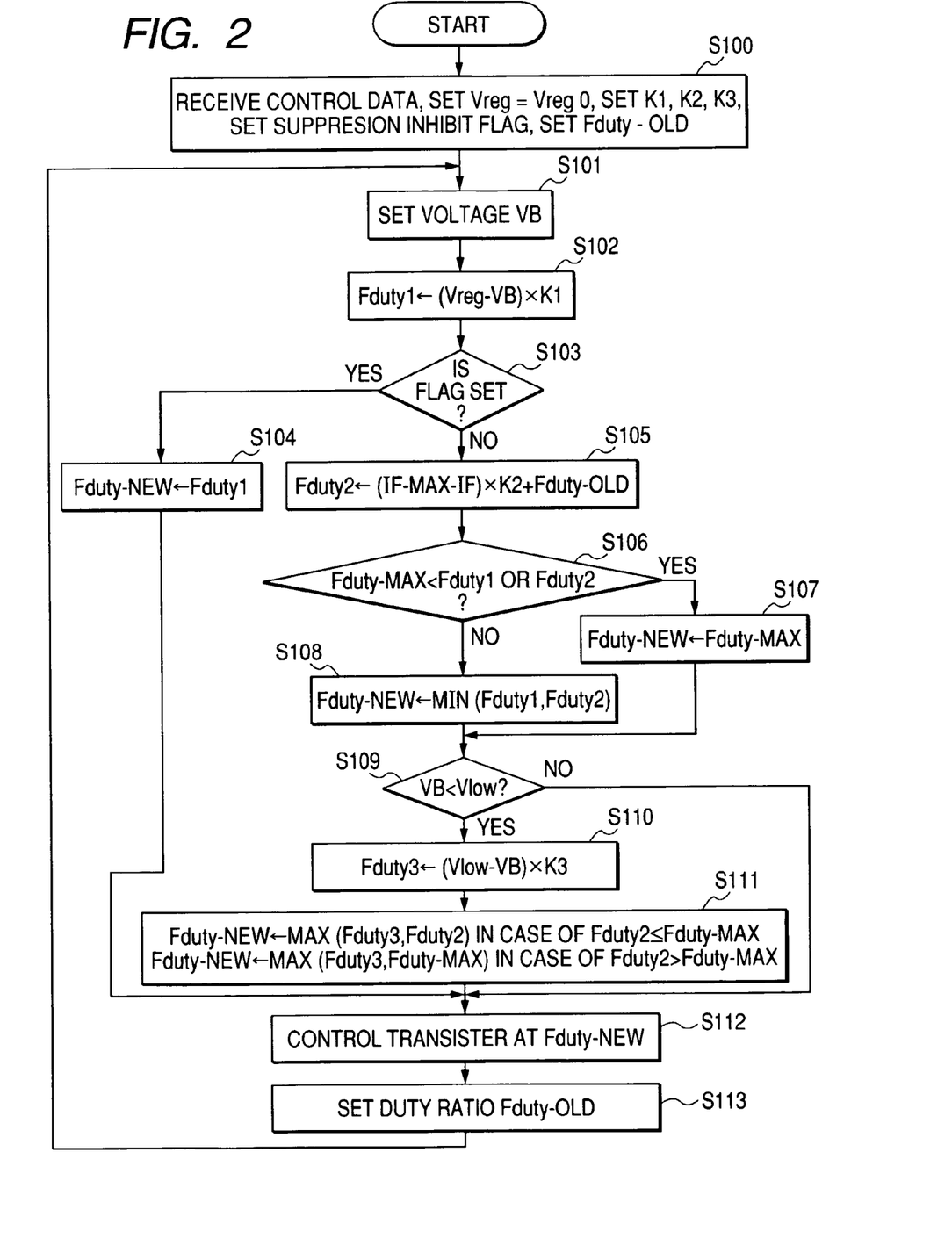
FIG. 2 is a flow chart showing processing executed in the apparatus shown in FIG. 1 according to the embodiments.
Figure 3:
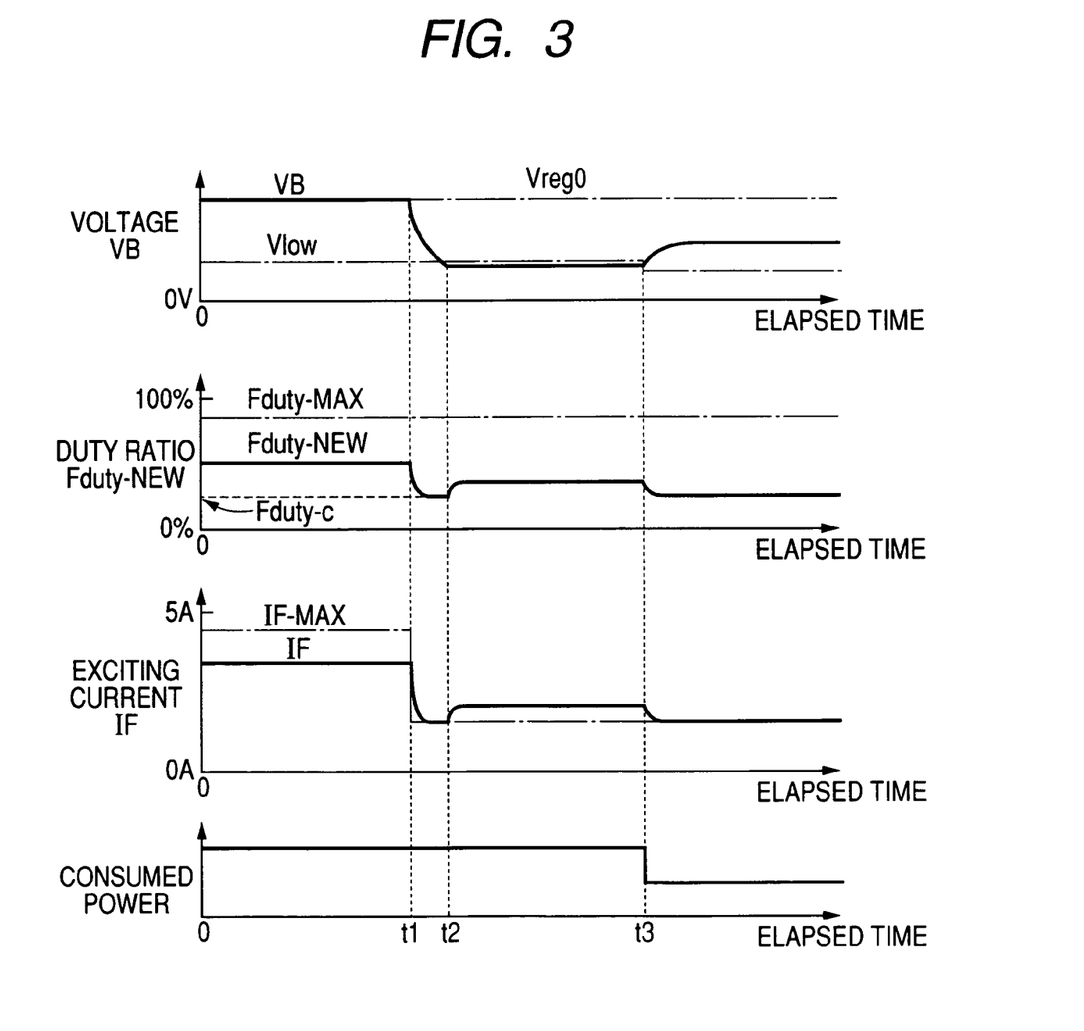
FIG. 3 is a time chart of a detected voltage, a duty ratio, an exciting current and consumed power according to a first embodiment.

FIG. 2 is a flow chart showing the processing performed in the control apparatus 1 to set a duty ratio of a PWM signal, and FIG. 3 is a time chart of a voltage VB of generated power, a current duty ratio Fduty-NEW, an exciting current IF and consumed power.

In this embodiment, the processing for changing the power generation in a non-suppression mode to the power generation in a suppression mode is initially described.

When an ignition switch (not shown) of a vehicle is turned on, the engine ECU 2 transmits an operation start signal to the control apparatus 1, and the apparatus 1 starts its operation in response to the signal.

Then, to control the generator 3, the engine ECU 2 determines a plurality of instruction values based on an output voltage of the battery 4 and information of operation conditions of the current consumers 5, and transmits the instruction values to the controller 13 of the apparatus 1. The instruction values include a first target value Vreg0, a maximum exciting current IF-MAX, a maximum duty ratio Fduty-MAX, a second target value Vlow, a first period setting value T1 (or first predetermined period of time) a third target value Vreg3, and a second period setting value T2 (or second predetermined period of time).

The value Vreg0 denotes a target value of a regulated voltage of the generated power in a non-suppression mode. For example, Vreg0 is set at 14.5V. When the engine ECU 2 intends not to restrain the power generation of the generator 3, the engine ECU 2 produces a first power control signal by setting a signal of the maximum exciting current IF-MAX at a high level. When the engine ECU 2 intends to restrain the power generation in the generator 3, the engine ECU 2 produces a second power control signal by setting the signal IF-MAX at a low level. The low level of the signal IF-MAX serves as a target value to which an exciting current is lowered in a suppression mode. The suppression of the generated power in the suppression mode is started in response to the signal IF-MAX of the low level. The maximum duty ratio Fduty-MAX denotes a target value of an upper limit of a duty ratio in a PWM signal transmitted to the transistor 14. The value Vlow denotes a threshold value used to judge whether or not a voltage VB of the generated power is sufficiently lowered in the suppression mode. The value Vlow is set to be lower than the value Vreg0 and to be higher than a lower limit voltage. When a voltage equal to or higher than the lower limit voltage is applied to each of current consumers 5 of a vehicle, the consumers 5 become operable. For example, Vlow is set at 11V.

Thereafter, the controller 10 receives these instruction values from the engine ECU 2 and converts the values into control data. Then, as shown in FIG. 2, at step S100, the controller 13 receives the control data. For example, the engine ECU 2 initially sets the signal IF-MAX at a high level to cause the generator 3 to start the power generation at a non-suppression mode (or normal mode). In response to the signal IF-MAX of the high level, the controller 13 sets a suppression inhibit flag (i.e., flag on), and a regulated voltage Vreg is initially set at the value Vreg0. Further, an old duty ratio Fduty-OLD is initially set at a predetermined value appropriate to a non-suppression mode and lower than the Fduty-MAX, and constants K1, K2 and K3 are appropriately set at predetermined positive values. The value Fduty-OLD denotes a previous duty ratio of a PWM signal at which the transistor 14 was turned on and off in an operation just before a current switching operation.

At step S101, a voltage VB is set at a voltage value detected in the detector 17 as a battery voltage. Further, if a value of the, regulated voltage Vreg is changed in other processing described in a second embodiment, the regulated voltage Vreg set at the changed value is adopted. In this embodiment, the value of the regulated voltage Vreg is not changed. Further, if the signal IF-MAX of a low level is received from the engine ECU 2, the suppression inhibit flag is cancelled (i.e., flag off).

At step S102, the controller 13 calculates a non-suppression duty ratio Fduty1 according to an equation:

$$F\text{duty}1=(V\text{reg}-VB)\times K1.$$

Therefore, the ratio Fduty1 is adjusted such that the voltage VB is almost set at the constant value Vreg (=Vreg0). Here, the controller 13 performs a proportional control using the value K1 sufficiently heightened. However, the controller 13 may perform an integral control according to an equation:

$$F\text{duty}1=(V\text{reg}-VB)\times K1+F\text{duty-OLD}.$$

At step S103, the controller 13 judges whether or not the suppression inhibit flag has been set. In case of an affirmative judgment (YES at step S103), the controller 13 sets a current duty ratio Fduty-NEW of a PWM signal at the value Fduty1 (step S104), and the controller 13 controls the transistor 14 to perform a switching operation at the duty ratio Fduty-NEW (step S112), and the detector 11 detects a value IF of an exciting current. Thereafter, the controller 13 sets a duty ratio Fduty-OLD at the value of the duty ratio Fduty-NEW (step S113), and the procedure returns to step S101. Therefore, when the detected voltage VB intends to be lower than the value Vreg (=Vreg0), the value Fduty-NEW is increased, and the generated power is increased so as to heighten the voltage VB. In contrast, when the detected voltage VB intends to be higher than the value Vreg, the value Fduty-NEW is decreased, and the generated power is decreased so as to lower the voltage VB. As a result, as shown in FIG. 3, until the controller 13 receives the signal IF-MAX of a low level, the generator 3 constantly generates electric power of the voltage VB set at the value Vreg0 at the non-suppression mode.

When the controller 13 receives the signal IF-MAX of a low level, which is lower than the detected exciting current value IF, from the engine ECU 2, the controller 13 cancels the suppression inhibit flag (step S101) and calculates the duty ratio Fduty1 (step S102). Then, the controller 13 judges that the suppression inhibit flag is off (NO at step S103), and the controller 13 calculates a transitional duty ratio Fduty2 according to an equation:

$$F\text{duty}2=(IF\text{-MAX}-IF)\times K2+F\text{duty-OLD (step S}\mathbf{105}).$$

Then, the controller 13 judges whether or not the value Fduty-MAX is lower than both the values Fduty 1 and Fduty2 (step S106). In case of an affirmative judgment (YES at step S106), the controller 13 sets a current duty ratio Fduty-NEW at the value Fduty-MAX (step S107). Therefore, a maximum value of the duty ratio Fduty-NEW is restrained at the value Fduty-MAX. In contrast, when at least one of the values Fduty1 and Fduty2 is equal to or lower than the value Fduty-MAX at step S106, the controller 13 sets a current duty ratio Fduty-NEW at the lower one (MIN(Fduty 1, Fduty2)) between the values Fduty 1 and Fduty2 (step S108). Because IF-MAX of the low level is lower than the value IF, the value Fduty2 is set to be lower than the value Fduty-OLD (=Fduty1) at step S105. Therefore, the duty ratio Fduty-NEW is set at the value Fduty2 at step S108.

After setting the duty ratio Fduty-NEW at step S107 or S108, the controller 13 judges whether or not the detected voltage VB is lower than the threshold value Vlow of the generated power (step S109). When VB≧Vlow is satisfied (NO at step S109), the transistor 14 performs a switching operation at the duty ratio Fduty-NEW (step S112) and sets the duty ratio Fduty-OLD (step S113), and a series of steps S101 to S109, S112 and S113 are repeated.

In this case, because the detected exciting current IF is higher than the low level of the signal IF-MAX, the value Fduty2 is set to be lower than the value Fduty-OLD (S105), and the transistor 14 performs a switching operation at a current duty ratio Fduty-NEW (=Fduty2) lower than a previous duty ratio Fduty-OLD. Therefore, as shown in FIG. 3, after the controller 13 receives the signal IF-MAX of the low level at a time t1, the duty ratio Fduty-NEW and the exciting current IF are gradually decreased such that the exciting current IF reaches the signal IF-MAX of the low level along an asymptotic line (IF=IF-MAX) and such that the duty ratio Fduty-NEW reaches a constant value Fduty-c. During this period of time, because the current consumers 5 continue to constantly consume electric power of the battery 4, the detected voltage VB is smoothly lowered. After the duty ratio Fduty-NEW reaches the constant value Fduty-c, the detected voltage VB is still lowered.

Thereafter, when the detected voltage VB becomes lower than the value Vlow, VB<Vlow is satisfied (YES at step S110), and the controller 13 calculates a suppression duty ratio Fduty3 according to an equation:

$$F\text{duty}3=(V\text{low}-VB)\times K3 \quad\quad\text{(step S}\mathbf{110}).$$

Then, at step S111, when Fduty2≦FdutyMAX is satisfied, the controller 13 sets a current duty ratio Fduty-NEW at the maximum one MAX(Fduty 2, Fduty3) between the values Fduty2 and Fduty3. In contrast, when Fduty2 >FdutyMAX is satisfied, the controller 13 sets a current duty ratio Fduty-NEW at the maximum one MAX (Fduty 3, Fduty-MAX) between the values Fduty3 and FdutyMAX. Thereafter, the transistor 14 performs a switching operation at the duty ratio Fduty-NEW (step S112) and sets the duty ratio Fduty-OLD (step S113), and a series of steps S101 to S112 are repeated.

In this embodiment, Fduty2<FdutyMAX is satisfied. When the controller 13 detects at step S109 that VB<Vlow is satisfied, a voltage difference (Vlow−VB) inevitably reaches a minimum of a predetermined value ΔV due to the performance of a sensor detecting the voltage VB and a repetition cycle of this processing. The constant K3 is preset such that k3>Fduty-c/ΔV is satisfied. In this case, the value Fduty3 (=(Vlow−VB)×K3) becomes higher than the value Fduty2 (=Fduty-c), so that the duty ratio Fduty-NEW is set at the value Fduty3 (step S111). In this case, the value of the exciting current IF corresponding to the value Fduty2 is increased to a value corresponding to the value Fduty3 at step S112, and the value Fduty2 is decreased at step S105 of a next cycle. That is, when VB<Vlow is once detected at step S109, the relation Fduty3>Fduty2 is maintained at step S111 after this detection. Similarly, in case of Fduty2 >Fduty-MAX, because Fduty3>Fduty2 is satisfied, the duty ratio Fduty-NEW is set at the value Fduty3 (step S111).

Therefore, as shown in FIG. 3, when the controller 13 detects at a time t2 that VB<Vlow is satisfied, the duty ratio Fduty-NEW is gradually increased so as to be maintained at an equilibrium duty value, and the transistor 14 performs a switching operation at the duty ratio Fduty-NEW (=Fduty3). The electric power consumed by the current consumers 5 is equal to that generated in the generator 3 according to the duty ratio Fduty-NEW set at the equilibrium duty value, and the detected voltage VB is maintained at an equilibrium voltage value which is determined in correspondence to the equilibrium duty value and is lower than the value Vlow by a slight difference. Here, the detected voltage VB maintained at the equilibrium voltage value is equal to or higher than the lower limit voltage with which all the current consumers 5 are operable.

Next, the processing for changing a duty ratio of a PWM signal during the suppression mode is described.

As shown in FIG. 3, when one of the consumers 5 requiring the highest supplied voltage among those of the consumers 5 stops its operation at a time t3 during the suppression mode, the engine ECU 2 lowers the previous target value Vlow to a new target value Vlow. In this case, because operating conditions of the current consumers 5 are changed at the time t3 so as to reduce an electric power consumed in the current consumers 5, the voltage VB is gradually and continuously increased and exceeds the previous target value Vlow and the new target value Vlow. In this case, VB<Vlow is not satisfied at step S109, and the transistor 14 performs a switching operation at the duty ratio Fduty-NEW (=Fduty2) set at step S105. Because the duty ratio Fduty2 is lower than the value Fduty3, the exciting current IF is gradually decreased so as to reaches the low level of the signal IF-MAX, and the duty ratio Fduty-NEW (=Fduty2) is converged at anew equilibrium duty value lower than the previous equilibrium duty value at step S108. In response to this new equilibrium duty value, the voltage VB is maintained to a new equilibrium voltage value.

Therefore, when electric power generated in the generator 3 is suppressed, the voltage of the generated power can be appropriately adjusted to a specific value lower than the value Vlow and can be maintained at the specific value. Accordingly, because the voltage of the generated power is maintained at a constant value during the suppression of the power generation, a change in the generated power can be appropriately restrained when the power generation in the generator 3 is suppressed. That is, the generator 3 can be smoothly transferred to a suppression mode and constantly generate the electric power without generating pulsation of the generated power.

Further, because pulsation of a driving torque required by the generator 3 is restrained, the engine ECU 2 can appropriately control an engine. Accordingly, the engine can be reliably driven under control of the engine ECU 2.

Further, because the power generation of the generator 3 can be constantly suppressed, fuel economy of a vehicle can be improved.

Further, even when operation conditions of the current consumers 5 are changed in a suppression mode, the controller 13 can controls the generator 3 to smoothly change the generated power and to constantly generate the electric power. Therefore, a change in a driving torque required by the generator 3 can be appropriately restrained.

Further, in response to a second power control signal (i.e., signal IF-MAX of low level) transmitted from the engine ECU 2, the controller 13 can control the generator 3 to generate the electric power while suppressing the power generation.

Further, the controller 13 can control the exciting current flowing through the exciting wire 30 by controlling the duty ratio of the PWM signal transmitted to the transistor 14.

Further, even when the controller 13 receives the setting value Vlow suddenly changed in the engine ECU 2 in response to a change of operation conditions of the current consumers 5 and transmitted from the engine ECU 2, the controller 13 can smoothly change the exciting current flowing through the exciting coil 30 in a suppression mode in response to the changed setting value Vlow and can maintain the exciting current at a constant value.

Further, because the voltage VB is maintained during the suppression of the power generation at the equilibrium voltage value equal to or higher than the lower limit voltage with which all the current consumers 5 are operable, the current consumers 5 can be reliably operated during the suppression of the power generation.

In this embodiment, the voltage VB is maintained at a constant value lower than the value Vlow during a period of time from t1 to t2. However, the voltage VB may be maintained at the value Vlow by setting the duty ratio Fduty-NEW (=Fduty3) according to an equation: Fduty3= (Vlow−VB)×K3+Fduty-OLD. In this case, the procedure may be modified such that the process of step S109 is not executed any more when VB<Vlow is once satisfied at step S109. Further, the value Vlow may be set to be equal to a value of the lower limit voltage with which all the current consumers 5 are operable.

Further, in this embodiment, the engine ECU 2 changes the setting value Vlow in response to a change of operation conditions of the current consumers 5. However, the controller 13 may change the setting value Vlow in response to a change of operation conditions of the current consumers 5 which is transmitted from the engine ECU 2.

Embodiment 2

When the engine ECU 2 judges according to signals from sensors that the control apparatus 1 operated in the suppression mode should be operated in a non-suppression mode, the engine ECU 2 transmits a signal IF-MAX of a high level to the control apparatus 1. Therefore, the control apparatus 1 stops suppressing the power generation of the generator 3. However, when the engine ECU 2 erroneously detects operation conditions of the current consumers 5 due to failures of sensors or the like, the engine ECU 2 fails to transmit a signal IF-MAX of a high level to the control apparatus 1 operated in the suppression mode. In this case, no setting of a suppression inhibit flag is continued in the controller 13, and there is a possibility that the battery 4 is undesirably dead due to the continuation of the suppression of the power generation. To prevent this problem, the controller 13 performs the procedures shown in FIGS. 2 and 4 separately from each other according to this embodiment to control the generator 3.

Figure 4:
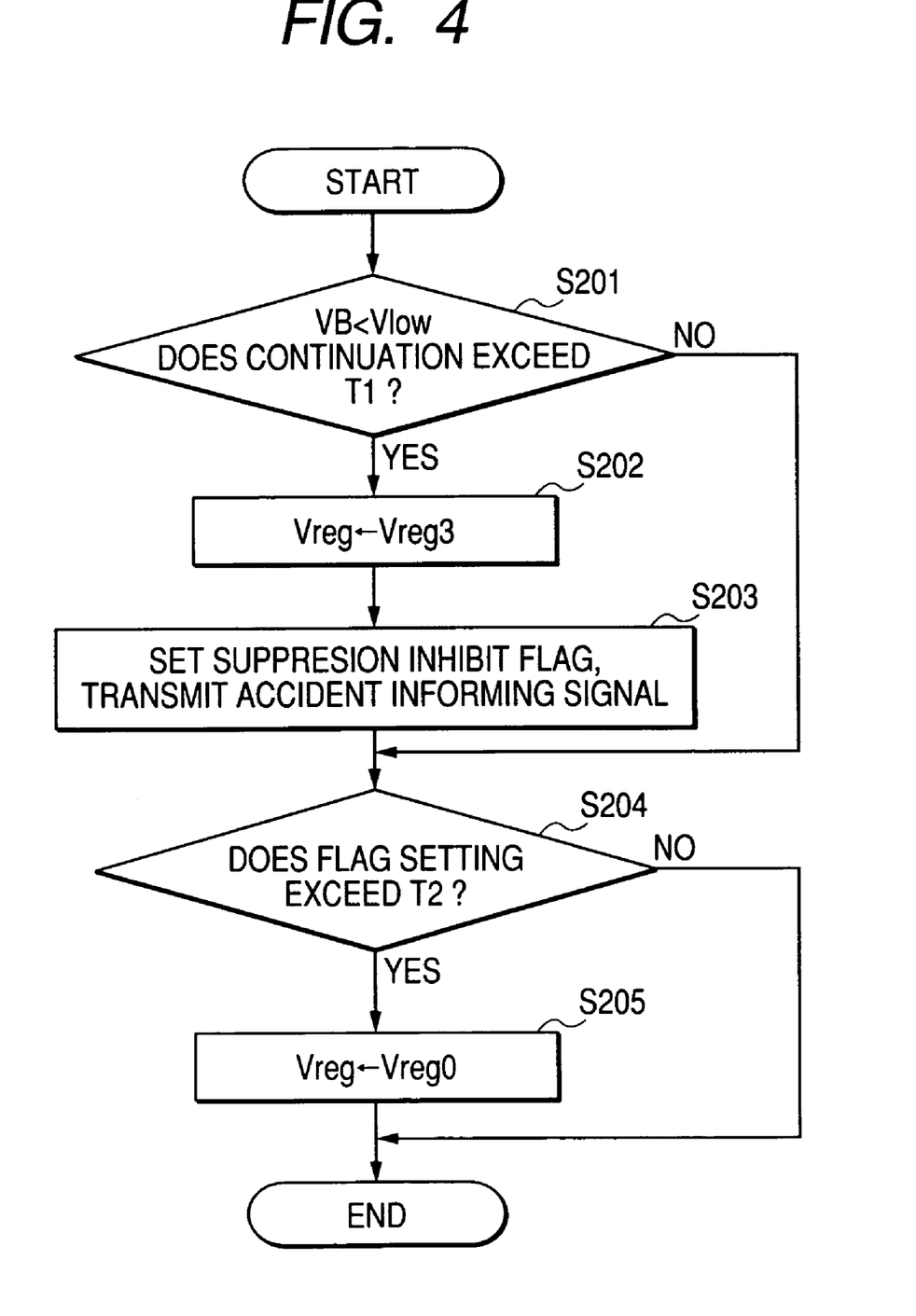
FIG. 4 is a flow chart showing the setting and canceling of a suppression inhibit flag and the setting of a regulated voltage of the generated power executed in the processing shown in FIG. 2 according to a second embodiment of the present invention.

FIG. 4 is a flow chart showing the setting and canceling of the suppression inhibit flag and the setting of a regulated voltage Vreg of the generated power executed in the processing shown in FIG. 2.

The setting and canceling of the suppression inhibit flag executed in the controller 13 is described with reference to FIG. 4. This processing is periodically executed, for example, every 10 milliseconds.

As shown in FIG. 4, the controller 13 judges whether or not the continuation of the detected voltage VB being lower than the value Vlow exceeds a first predetermined period T1 of time (step S201). The value T1 is preset at an optimum period of time such that the battery 4 is not dead even though the voltage VB being slightly lower than the value Vlow is continued for the period T1 of time. The period T1 is, for example, set at 1 minute. In case of a negative judgment (NO at step S201), the procedure proceeds to step S204.

In contrast, in case of an affirmative judgment (YES at step S201), the controller 13 judges that there is a high probability that the engine ECU 2 erroneously detects operation conditions of the current consumers 5. Therefore, the controller 13 sets the regulated voltage Vreg at a value Vreg3 higher than Vlow but lower than Vreg0 (step S202). The value Vreg3 denotes a target value for regulation of the voltage VB of the generated power. The value Vreg3 is set to be higher than the value Vlow and lower than the value Vreg0 (Vlow<Vreg3<Vreg0).

Then, the controller 13 sets a suppression inhibit flag (flag on) and transmits an accident informing signal to the engine ECU 2 (step S203), and the procedure proceeds to step S204. At step S204, the controller 13 judges whether or not the continuation of the setting of the suppression inhibit flag exceeds a second predetermined period T2 of time. The period T2 is, for example, set at five minutes. The value Vreg3 is set at an optimum voltage value such that the battery 4 is not dead even though the voltage VB equal to the value Vreg3 is continued for the period of time T2 after the voltage VB being slightly lower than the value Vlow is continued for the period of time T1. For example, Vreg3 is set at 13.5V.

In case of a negative judgment (NO at step S204), the procedure is ended to restart this procedure when 10 milliseconds is elapsed.

In contrast, in case of an affirmative judgment (YES at step S204), the controller 13 finally judges that the engine ECU 2 erroneously detects operation conditions of the current consumers 5. Therefore, the controller 13 sets the regulated voltage Vreg at the value Vreg0 higher than Vreg3 (step S205) to operate the generator 3 in the non-suppression mode, and the procedure is ended to restart this procedure when 10 milliseconds has elapsed.

Figure 5:
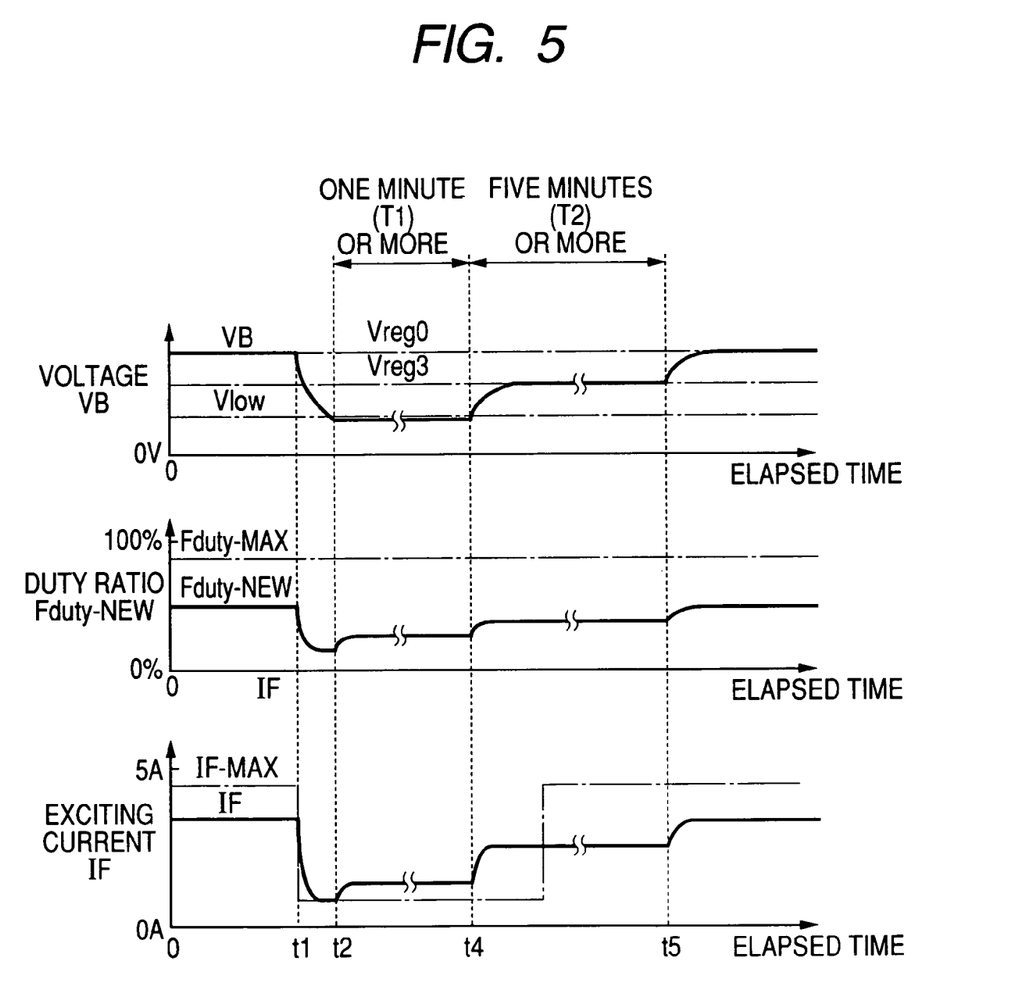
FIG. 5 is a time chart of a detected voltage, a duty ratio and an exciting current in the power generation control apparatus according to the second embodiment in a case where an engine controller fails to end the suppression of the power generation in a generator.

An example of the operation of the controller 13 based on this procedure is described with reference to FIG. 5. FIG. 5 is a time chart of a detected voltage, a duty ratio and an exciting current obtained in the procedure shown in FIGS. 2 and 4.

As shown in FIG. 5, the continuation of the suppression of the power generation based on the duty ratio Fduty3 of the PWM signal exceeds one minute (period T1) at a time t4. In this case, as shown in FIG. 4, the controller 13 sets the regulated voltage Vreg at a value Vreg3 (step S202) and sets a suppression inhibit flag (step S203). Because the continuation of the setting of the suppression inhibit flag does not exceed five minutes (period T2) (NO at step S204), the procedure shown in FIG. 4 is ended.

Then, as shown in FIG. 2, the regulated voltage Vreg set at the value Vreg3 is adopted (step S101), and the controller 13 controls the transistor 14 to perform a switching operation at a duty ratio Fduty1 (steps S102, S103, S104 and S112). Therefore, as shown in FIG. 5, the duty ratio Fduty1 is gradually increased from the Fduty3 last determined to gradually increase the detected voltage VB to the value Vreg3 and to gradually increase the exciting current IF, and the transistor 14 performs the switching operation at a duty ratio Fduty1 gradually increased to loosen the suppression of the power generation (semi-suppression mode). Then, when the detected voltage VB reaches the value Vreg3, the transistor 14 stably performs the switching operation at the fixed duty ratio Fduty1 in a semi-suppression mode.

Further, the controller 13 outputs an accident informing signal to the engine ECU 2 (step S203). In response to this accident informing signal, the engine ECU 2 outputs an alarm to occupants of the vehicle and performs processing to deal with failures of sensors or the like.

Thereafter, as shown in FIG. 5, the continuation of the setting of the suppression inhibit flag exceeds five minutes (period T2) at a time T5. In this case, as shown in FIG. 4, the controller 13 sets the regulated voltage Vreg at the value Vreg0 higher than the value Vreg3 (step S205), and the procedure shown in FIG. 4 is ended.

Then, as shown in FIG. 2, the regulated voltage Vreg set at the value Vreg0 is adopted (step S101), and the controller 13 controls the transistor 14 to perform a switching operation at a duty ratio Fduty1 (steps S102, S103, S104 and S112). Therefore, as shown in FIG. 5, the duty ratio Fduty1 is gradually increased from the Fduty3 last determined to gradually increase the detected voltage VB to the value Vreg0 and to gradually increase the exciting current IF, and the transistor 14 performs the switching operation at a duty ratio Fduty1 gradually increased. Then, when the detected voltage VB reaches the value Vreg0, the transistor 14 stably performs the switching operation at the fixed duty ratio Fduty1. Therefore, the generator 3 performs the power generation in the non-suppression mode.

Accordingly, even when the suppression of the power generation in the generator 3 is undesirably continued based on an instruction of the engine ECU 2 which is, for example, erroneously generated due to failures of sensors or the like, the controller 13 can control the generator 3 to stop the suppression of the power generation. Therefore, an output voltage of the battery 4 can be prevented from being excessively lowered so as to dead the battery 4.

Further, when the suppression of the power generation in the generator 3 is undesirably continued, the controller 13 transmits an accident informing signal to the engine ECU 2. Accordingly, the controller 13 can inform the engine ECU 2 that abnormal conditions occurs.

Further, when the suppression of the power generation in the generator 3 is undesirably continued, for example, for one minute (or first predetermined period T1), the controller 13 can control the generator 3 to generate the electric power in a semi-suppression mode (VB=Vreg3) in which an amount of generated power is higher than that in the suppression mode (VB=Vlow) and is lower than that in the non-suppression mode (VB=Vreg0). Accordingly, a change in generated power can be lowered as compared with that obtained when the suppression mode is directly changed to the non-suppression mode. That is, because the engine ECU 2 can detect a stable driving torque required by the generator 3, the engine ECU 2 can reliably control an engine.

Further, when the semi-suppression of the power generation in the generator 3 is undesirably continued, for example, for five minutes (or second predetermined period T2), the controller 13 can control the generator 3 to generate the electric power in the non-suppression mode. Accordingly, the battery 4 can be reliably prevented from excessively lowering an output voltage and from being dead.

In this embodiment, the controller 13 controls the generator 3 to gradually loosen the suppression of the power generation of the generator 3 such that an operation mode in the power generation is changed from the suppression mode to the non-suppression mode through the semi-suppression mode (VB=Vreg3). However, the controller 13 may control the generator 3 to directly change the power generation in the suppression mode to that in the non-suppression mode.

Further, the controller 13 judges at step S201 whether or not continuation of VB<Vlow exceeds the period T1. However, when the voltage VB is maintained at the value Vlow after the time t2, the controller 13 may judge whether or not continuation of VB=Vlow exceeds the period T1 and set the regulated voltage Vreg at the value Vreg3 when continuation of VB=Vlow exceeds the period T1.

What is claimed is:

1. An apparatus for controlling a generator having an armature winding and an exciting winding rotated around each other to generate electric power in the armature winding in accordance with an exciting current flowing through the exciting winding, comprising:
    a control signal receiving unit which receives a first power control signal and a second power control signal;
    a voltage detector which detects a voltage of electric power generated in the generator; and
    a power controller which receives controls the generator in response to the first power control signal received by the control signal receiving unit such that the generator generates the electric power so as to maintain the voltage detected by the voltage detector at a first target value, and controls the generator in response to the second power control signal received by the control signal receiving unit such that the power generation of the generator is suppressed based on a difference between a value of the detected voltage and a second target value lower than the first target value so as to maintain the detected voltage at a predetermined value lower than the first target value,
    wherein the power controller has a exciting current controller which controls the exciting current flowing through the exciting coil at a first predetermined current value in response to the first power control signal to maintain the voltage detected by the voltage detector at the first target value and controls the exciting current at a second predetermined current value lower than the first predetermined current value in response to the second power control signal to maintain the detected voltage at the predetermined value.

2. The apparatus according to claim 1, wherein the power controller controls the generator in response to the second power control signal such that an amount of the electric power generated by the generator is lowered until the detected voltage becomes lower than the second target value and the lowered electric power is heightened according to the difference so as to maintain the detected voltage at the predetermined value.

3. The apparatus according to claim 1, wherein the exciting current controller controls a duty ratio of a current control signal such that the exciting current flows through the exciting winding according to the duty ratio of the current control signal.

4. The apparatus according to claim 1, wherein an engine controller disposed outside the apparatus outputs the first or second power control signal to the power controller such that the engine controller instructs the generator to generate the electric power.

5. The apparatus according to claim 1, wherein the power controller outputs an accident informing signal indicating occurrence of a failure to an engine controller disposed outside the apparatus when continuation of the detected voltage maintained at the predetermined value exceeds a first predetermined period of time.

6. The apparatus according to claim 1, wherein an engine controller disposed outside the apparatus intermittently detects an operation condition of a current consumer consuming the electric power generated in the generator, sets the second target value according to the detected operation condition, intermittently transmits the second target value to the power controller, and changes the second target value transmitted to the power controller when detecting a change of the operation condition of the current consumer.

7. The apparatus according to claim 1, further comprising an engine controller which receives information indicating a first operation condition of a current consumer consuming the electric power generated in the generator, sets the second target value in response to the information indicating the first operation condition, transmits the second target value to the power controller, receives information indicating a second operation condition of the current consumer, and transmits the information indicating the second operation condition of the current consumer to the power controller after the transmission of the second target value,
    wherein the power controller changes the second target value to a third target value lower than the first target value according to the information indicating the second operation condition received from the engine controller and controls the generator such that the power generation of the generator is suppressed based on a difference between a value of the detected voltage and the third target value so as to maintain the detected voltage at a second predetermined value lower than the first target value.

8. The apparatus according to claim 1, wherein the power controller controls the generator such that the voltage detected by the voltage detector is maintained at a third target value higher than the second target value and lower than the first target value when continuation of the detected voltage maintained at the predetermined value exceeds a first predetermined period of time.

9. The apparatus according to claim 8, wherein the power controller controls the generator such that the voltage detected by the voltage detector is maintained at the first target value when continuation of the detected voltage maintained at the third target value exceeds a second predetermined period of time.

10. The apparatus according to claim 1, wherein the power controller controls the generator such that the voltage detected by the voltage detector is maintained at the first target value when continuation of the detected voltage maintained at the predetermined value exceeds a first predetermined period of time.

11. The apparatus according to claim 1, wherein the electric power generated in the generator is changed with an exciting current flowing through an exciting wire of the generator, and the power controller controls the electric power generated in the generator by adjusting the exciting current.

12. The apparatus according to claim 1, wherein the electric power generated in the generator is consumed in a current consumer, the current consumer is operable when a voltage equal to or higher than a lower limit voltage is applied to the current consumer, and the lower limit voltage is equal to or higher than the predetermined value.

13. The apparatus according to claim 1, wherein the predetermined value is lower than the second target value.

14. The apparatus according to claim 1, wherein the predetermined value is equal to the second target value.

15. The apparatus according to claim 1, further comprising an engine controller which judges whether the generator should generate the electric power in a non-suppression mode or in a suppression mode, generates the power control signal in response to a judgment that the generator should generate the electric power in the non-suppression mode, and generates the second power control signal in response to a judgment that the generator should generate the electric power in the suppression mode.

16. The apparatus according to claim 15, wherein the engine controller is adapted to judge, according to the information indicating an operation condition of a current consumer consuming the electric power, whether the generator should generate the electric power in the non-suppression mode or in the suppression mode.

17. An apparatus for controlling power generation of a generator comprising:
- an engine controller which generates a first power control signal and a first target value in response to information indicating a first operation condition of a current consumer consuming the electric power generated in the generator, generates a second power control signal and a second target value in response to the information indicating a second operation condition of the current consumer,
- a voltage detector which detects a voltage of electric power generated in the generator; and
- a power controller which controls the generator in response to the first power control signal received from the engine controller such that the generator generates the electric power so as to maintain the voltage detected by the voltage detector at the first target value, and controls the generator in response to the second control signal received from the engine controller such that the power generation of the generator is suppressed based on a difference between a value of the detected voltage and the second target value lower than the first target value so as to maintain the detected voltage at a first predetermined value lower than the first target value;
- wherein the engine controller is adapted to receive information indicating a third operation condition of the current consumer, and transmits the information indicating the third operation condition of the current consumer to the power controller after the transmission of the second target value; and
- wherein the power controller changes the second target value to a third target value lower than the first target value according to the information indicating the third operation condition received from the engine controller and controls the generator such that the power generation of the generator is suppressed based on a difference between a value of the detected voltage and the third target value so as to maintain the detected voltage at a second predetermined value lower than the first target value.

18. An apparatus for controlling a generator having an armature winding and an exciting winding rotated around each other to generate electric power in the armature winding in accordance with an exciting current flowing through the exciting winding, comprising:
- a communicating unit which communicates with an engine controller disposed outside the apparatus to receive a first power control signal, a second power control signal and a suppression target value from the engine controller;
- a voltage detector which detects a voltage of electric power generated in the generator; and
- a power controller which controls the generator in response to the first power control signal received by the communicating unit such that the generator generates the electric power so as to maintain the voltage detected by the voltage detector at a non-suppression target value higher than the suppression target value, and controls the generator in response to the second power control signal received by the communicating unit such that the power generation of the generator is suppressed so as to maintain the detected voltage at the suppression target value,
- wherein the power controller has an exciting current controller which controls the exciting current flowing through the exciting coil at a first predetermined current value in response to the first power control signal to maintain the voltage detected by the voltage detector at the first target value and controls the exciting current at a second predetermined current value lower than the first predetermined current value in response to the second power control signal to maintain the detected voltage at the predetermined value.

19. The apparatus according to claim 18, wherein the engine controller is adapted to intermittently detect an operation condition of a current consumer consuming the electric power generated in the generator, to set the suppression target value according to the detected operation condition, to intermittently transmit the suppression target value to the power controller, and to change the suppression target value transmitted to the power controller when detecting a change of the operation condition of the current consumer.

* * * * *